United States Patent
Yin (10) Patent No.: US 8,446,922 B2
(45) Date of Patent: May 21, 2013

(54) METHOD AND DEVICE FOR MULTIPLEXING AND MAPPING SERVICES TO AN OTU

(75) Inventor: Hui Yin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 267 days.

(21) Appl. No.: 12/705,061

(22) Filed: Feb. 12, 2010

(65) Prior Publication Data

US 2010/0209107 A1    Aug. 19, 2010

(30) Foreign Application Priority Data

Feb. 13, 2009    (CN) .......................... 2009 1 0007211

(51) Int. Cl.
*H04J 3/06*    (2006.01)

(52) U.S. Cl.
USPC ........................................................ 370/520

(58) Field of Classification Search
USPC .................. 370/520; 398/58, 66; 375/134
See application file for complete search history.

(56) References Cited

U.S. PATENT DOCUMENTS

| 2005/0036520 | A1* | 2/2005 | Zeng et al. | 370/503 |
| 2008/0044183 | A1* | 2/2008 | Perkins et al. | 398/58 |

FOREIGN PATENT DOCUMENTS

| CN | 1741429 A | 3/2006 |
| CN | 1791278 A | 6/2006 |
| CN | 1901536 A | 1/2007 |
| CN | 101155016 A | 4/2008 |
| CN | 101325465 A | 12/2008 |
| CN | 101489157 B | 6/2011 |
| WO | WO 2008/101377 A1 | 8/2008 |

OTHER PUBLICATIONS

Series G: Transmission Systems and Media, Digital Systems and Networks, Digital Transmission systems—Digital Networks—SDH network characteristics, "Management of the Transport Network—Enterprise Viewpoint for Simple Subnetwork Connection Management", International Telecommunication Union, G.852.1, Nov. 1996.

Series G: Transmission Systems and Media, Digital Systems and Networks, Digital Transmission systems—Digital Networks—Management of Transport Network, "Enterprise Viewpoint for Pre-Provisioned Link Connection Management", International Telecommunication Union , G.852.10, Mar. 1999.

Serie G: Sistemas Y Medios De Transmisión, Sistemas Y Redes Digitales, Sistemas de Transmisión digital—Redes digitales—Gestión de red de transporte, Punto de Vista de la empresa para la gestión de enlaces proporcionados previamente, Union Internacional de Telecomunicaciones, G.852.12, Mar. 1999.

(Continued)

*Primary Examiner* — Chandrahas Patel
(74) *Attorney, Agent, or Firm* — Brinks Hofer Gilson & Lione (57) ABSTRACT

A method for multiplexing and mapping services to an Optical channel Transport Unit (OTU) includes: filling the service data into a container block covering an Optical channel Payload Unit (OPU) area container having at least one frame. The container block includes at least one OPU area container having a frame. The OPU area container is composed of at least one OPU area sub-timeslot, and is configured to fill the service clock information into the Optical Channel Payload Unit Overload (OPU OH) area. A device for multiplexing and mapping services to an OTU is provided in an embodiment of the present invention.

11 Claims, 6 Drawing Sheets

OTHER PUBLICATIONS

Series G: Transmission Systems and Media, Digital Systems and Networks, Digital networks—Management of Transport Network, Enterprise Viewpoint for Pre-provisioned Route Discovery, International Telecommunication Union, G.852.16, Jan. 2001.

Series G: Transmission Systems and Media, Digital Systems and Networks, Digital Transmission systems—Digital Networks—Management of Transport Network, "Enterprise Viewpoint Description of Transport Network Resource Model", International Telecommunication Union, G.852.2, Mar. 1999.

Series G: Transmission Systems and Media, Digital Systems and Networks, Digital Transmission systems—Digital Networks—Management of Transport Network, "Enterprise Viewpoint for Topology Management", International Telecommunication Union, G.852.3, Mar. 1999.

Series G: Transmission Systems and Media, Digital Systems and Networks, Digital Transmission systems—Digital Networks—Management of Transport Network, "Enterprise Viewpoint for Trail Management", International Telecommunication Union, G.852.6, Mar. 1999.

Series G: Transmission Systems and Media, Digital Systems and Networks, Digital Transmission systems—Digital Networks—Management of Transport Network, "Enterprise Viewpoint for Pre-Provisioned Adaptation Management", International Telecommunication Union, G.852.8, Mar. 1999.

Series G: Transmission Systems and Media, Digital Systems and Networks, Digital Terminal Equipments—General , Series Y: Global Information Infrastructure, Internet Protocol Aspects and Next-Generation Networks, Internet Protocol Aspects, Interfaces for the Optical Transport Network (OTN), International Telecommunication Union, G.709.Y.1331, Dec. 2009.

* cited by examiner

METHOD AND DEVICE FOR MULTIPLEXING AND MAPPING SERVICES TO AN OTU

CROSS-REFERENCE TO RELATED APPLICATION

This application claims priority to Chinese Patent Application No. 200910007211.7, filed on Feb. 13, 2009, which is hereby incorporated by reference in its entirety.

FIELD OF THE DISCLOSURE

The present disclosure relates to the network transmission technology field, and in particular, to a method and a device for multiplexing and mapping services to an Optical channel Transport Unit (OTU).

BACKGROUND

Optical Transport Network (OTN) refers to a transport network to perform optical area processing of signals at the client layer. The OTN functions include transmission, multiplexing, routing, monitoring, and survivability functions. A main feature of the OTN is that the concept of optical layer is introduced. The optical layer is added between electrical multiplexing layer and physical layer of a Synchronous Digital Hierarchy (SDH) transport network. The most basic object processed by the OTN is optical wavelength. The services at the client layer are multiplexed, transmitted, routed, and amplified in the form of optical wavelength on an optical network, and add-drop multiplexing and cross connection of the services are performed in an optical domain to provide effective and reliable transmission of the signals of a customer. In the hierarchical structure of the OTN, the OTN is broken down into several independent networks in layers. The optical layer is classified into the Optical CHannel (OCH) layer, Optical Multiplexer Section (OMS) layer, and Optical Transport Section (OTS) layer. Each hierarchical network can be further segmented into sub-networks and links between sub-networks to reflect the internal structure of the network at the layer.

The OCH is responsible for selecting routes, allocating wavelength, and arranging connection for signals in different formats at the client layer, thus providing the end-to-end optical channel interworking function. The function includes: re-arranging optical channel connection to flexibly implement routing of the network; processing the optical channel overhead to ensure the integrity of optical channel adaptation information; and providing the optical channel monitoring function for the running and management of the network layer. The OCH is further classified into the Optical channel Payload Unit (OPU), Optical channel Data Unit (ODU), and OTU. The subdividing of OCH into sub hierarchies is to meet the requirements for multi-protocol services that are adaptive to optical network transmission and for network management and maintenance.

Figure 1:
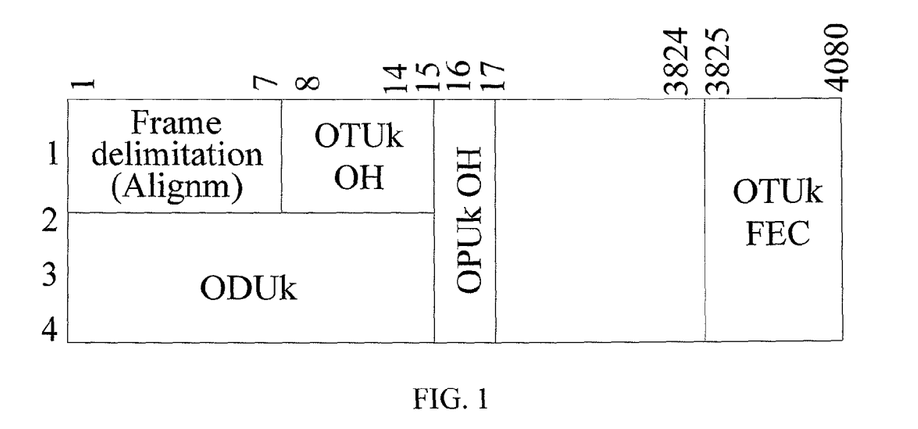
FIG. 1 shows a structure of an OTN frame in the prior art.

FIG. 1 shows a structure of an OTN frame with the existing technology. The OTN frame format with the existing technology is defined as follows:

The OTN frame includes the Optical channel Payload Unit-k (OPUk) payload, the Forward Error Correction (FEC) part of the Optical channel Transport Unit-k (OTUk), and the overheads produced by transmitting the service data payload. The overheads include the Optical channel Payload Unit-k Overhead (OPUk OH) in columns 15 and 16, Optical channel Data Unit-k Overhead (ODUk OH) in columns 1 to 14 in rows 2 to 4, and Optical channel Transport Unit-k Overhead (OTUk OH) in columns 8 to 14 in row 1. The OTUk is called a thoroughly standardized OTU. k represents a rate level, where, k=1 represents 2.5 Gbit/s, k=2 represents 10 Gbit/s, and k=3 represents 40 Gbit/s.

When the OTN is widely used, services at various rates need to be mapped into a high-rate OTUk network for transmission; and the high-rate OTUk needs to de-map the service data to acquire multiple routes of low-rate services.

With the existing technology, the OTN multiplexing and mapping are implemented in the following mode: a Positive Justification Opportunity (PJO) and a Negative Justification Opportunity (NJO) are set in a high-rate OTUk to compensate the difference between high-rate OTUk and low-rate OTUj clock, thus implementing mutual conversion of OTN signals at various rate levels. As shown in FIG. 1, the OPUk OH is located in columns 15 and 16 of the OTUk frame. The part includes a Payload Structure Identifier (PSI) byte, a Justification Control (JC) byte, a Negative Justification Opportunity (NJO) byte, a Positive Justification Opportunity 1 (PJO1) byte, and a Positive Justification Opportunity 2 (PJO2) byte. The JC byte is used for explaining whether the data of NJO, JO1, and JO2 is effective. These justification bytes are used for adjusting transmitted clock information.

With the PJO and NJO methods, only services at some rate levels can be multiplexed and mapped into the OTN. Therefore, only several types of services can be mapped.

SUMMARY

A method for multiplexing and mapping services to an OTU is provided. The method includes:

filling service data into a container clock that covers an OPU area container having at least one frame, where the container block includes at least one OPU area container having a frame, and the OPU area container is composed of at least one OPU area sub-timeslot; and filling the service clock information in the OPU OH area.

A device for multiplexing and mapping services to an OTU is provided. The device includes:

a service data filling unit, configured to fill service data into a container clock that covers an OPU area container having at least one frame, where the container block includes at least one OPU area container having a frame, and the OPU area container is composed of at least one OPU area sub-timeslot; and a service clock information filling unit, configured to fill the service clock information in the OPU OH area.

BRIEF DESCRIPTION OF THE DRAWINGS

To explicitly explain the technical solution according to an embodiment of the present disclosure or the technical solution in the prior art, the figures used in the descriptions of the embodiments or the prior art are introduced as follows. Obviously, the following figures are only some exemplary embodiments of the present invention, based on which other figures can be obtained by those skilled in the art without creative work.

DETAILED DESCRIPTION

The following section explicitly describes the technical solution provided in the embodiments of the present disclosure. Obviously, only parts of, instead of all of, the embodiments of the present disclosure are involved herein. All the other embodiments obtained by those skilled in the art without creative work based on the embodiments of the present invention fall in the scope of protection of the present invention.

A method for multiplexing and mapping services to an OTU is provided in an embodiment of the present disclosure to meet requirements of services of different types at different rates. Correspondingly, a device is also provided in an embodiment of the present disclosure. The following sections describe the method and the device respectively in detail.

Figure 2:
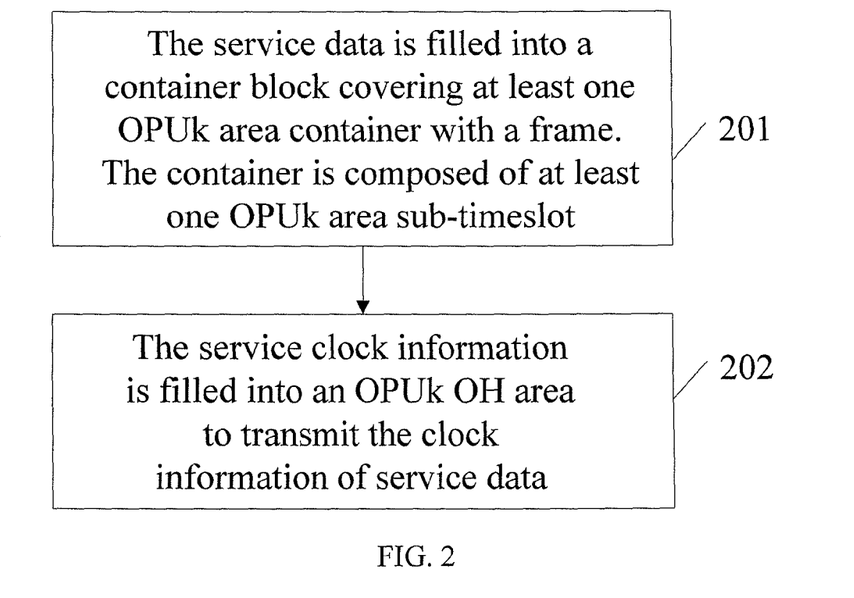
FIG. 2 is a flowchart of a method for multiplexing and mapping services to an OTUk provided in an embodiment of the present disclosure.

FIG. 2 is a flowchart of a method for multiplexing and mapping services to an OTUk provided in an embodiment of the present disclosure. The method includes:

Step 201: filling service data into a container block composed of at least one OPUk area container having at least one frame, where the OPUk area container is composed of at least one OPUk area sub-timeslot.

The container block is composed of at least one OPUk area container having a frame. The OPUk area container is composed of one or more sub-timeslots after an OPUk area is divided into multiple sub-timeslots and byte interleaving of each sub-timeslot is performed.

Step 202: filling service clock information into an OPUk OH area to transmit the clock information of service data.

It is understandable that step 201 and step 202 needs not to be performed in sequence.

In this embodiment, the service data and service clock information are transmitted respectively. The service data is filled into a container block. The container block is composed of OPUk area containers having at least one frame. An OPUk area container is composed of at least one OPUk area sub-timeslot. Different sub-timeslots are allocated to meet the requirements of services of different types at different rates. In addition, the service clock information is filled into the OPUk OH area for transmitting the clock information of service data. The service clock information is adjusted according to the byte-based step, and the service data is bundled according to the occupied timeslot for transmission and is adjusted uniformly to ensure the high-performance transparent transmission of service clock information and effectively reduce the complexity of transmitting and processing service data. Furthermore, the high-performance transparent transmission of service clock information helps a de-mapping receiving end effectively filter out a great deal of jitter produced in the process of OTN multiplexing, mapping, and demultiplexing, and this recovers a high-performance clock.

The following section describes the mapping of service data and service clock information.

Mapping of Service Data

An OPUk area is divided into Tp sub-timeslots. An OTUk provides Tc (Tc=1, 2, 3 . . . Tp) sub-timeslots to transmit service data. One or more sub-timeslots are combined into a container to transmit service data. The rate of mapped services can be 0 to $$\frac{f_{opuk}}{Tp} * Tc \text{ Gbit/s}.$$

Each sub-timeslot contains Mts bytes, where Mts=3808×4/Tp. The following section takes 32 sub-timeslots as an example. An OPUk area provides 32 sub-timeslots and supports 1 to 32 routes of service mapping. The rate of mapped services can be 0 to $$\frac{f_{opuk}}{32} * n \text{ Gbits/s } (n = 1 \text{ to } 32).$$

The size of each sub-timeslot is 3808×4/32=476 bytes. Multiple sub-timeslots among 32 sub-timeslots can be combined into a container. For example, three sub-timeslots are combined into a container to support a route of service mapping. The OPUk area containers having one or more frames can be classified into a container block. For convenience, all the container blocks can be classified evenly. For example, every Tp frames can be classified into a container block according to the Tc value, so that the size of each container block is as uniform as possible, that is, the number n of frames contained in each container is uniform. A container block is in a minimal unit of one sub-timeslot in an OPUk area having one frame, that is, 476 bytes. In specific application, uniform container blocks can be acquired according to the Tc and Tp values by using the Sigma-Delta accumulator method.

For example, when Tc=2 and Tp=32, two sub-timeslots in the OPUk area having the first frame to the 16$^{th}$ frame are classified into the first container block, and two sub-timeslots in the OPUk area having the 17$^{th}$ frame to the 32$^{nd}$ frame are classified into the second container block.

When Tc=3 and Tp=32, three sub-timeslots in the OPUk area having the first frame to the 11$^{th}$ frame are classified into the first container block, three sub-timeslots in the OPUk area having the 12$^{th}$ frame to the 22$^{nd}$ frame are classified into the second container block, and three sub-timeslots in the OPUk area having the 23$^{rd}$ frame to the 32$^{nd}$ frame are classified into the third container block.

Mapping of the Service Clock Information

A General Map Pointer (GMP) may be used for transmitting the service clock information. The GMP is 16-bit data. To ensure the reliability of transmission, GMP is transmitted for three times in an OPU OH area. The GMP occupies the bytes in the 15$^{th}$ and 16$^{th}$ columns in the 1$^{St}$ to 3$^{rd}$ rows.

Figure 3:
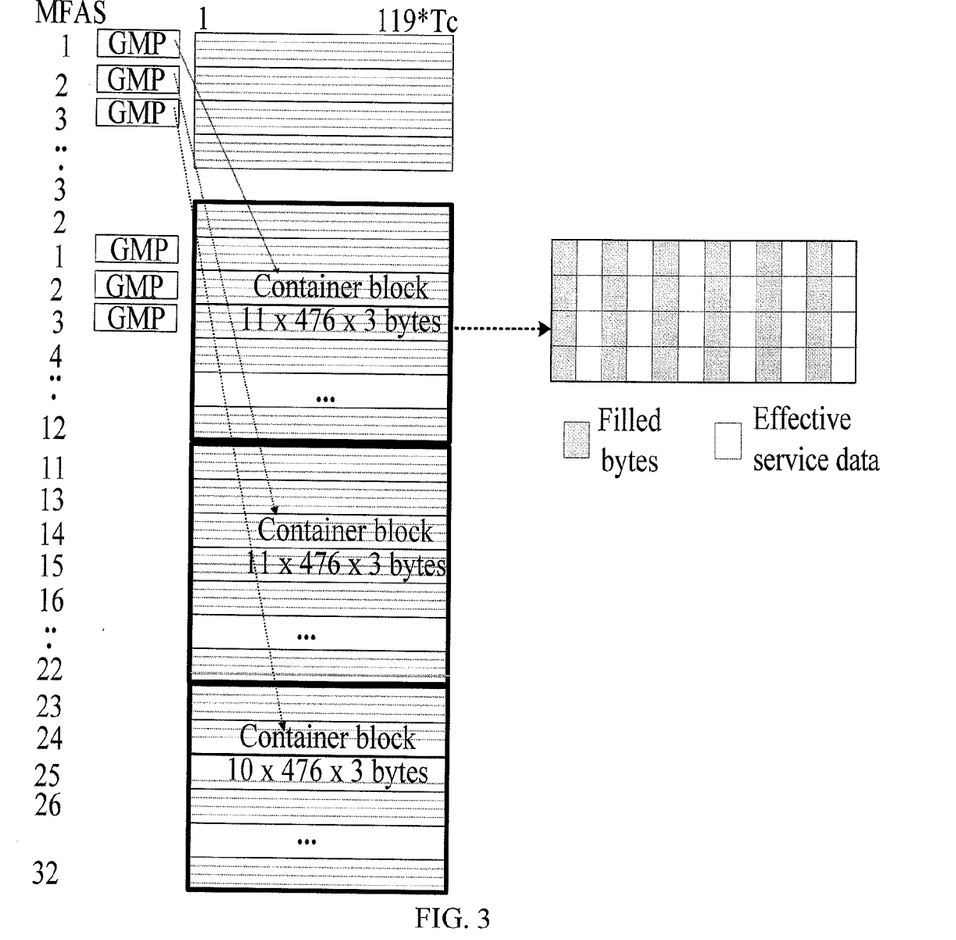
FIG. 3 shows functions of a General Map Pointer (GMP) provided in an embodiment of the present disclosure.

FIG. 3 shows the GMP function provided in an embodiment of the present disclosure. The Multi-Frame Alignment Signal (MFAS) occupies the 7$^{th}$ byte in the 1$^{st}$ row of an OTUk frame to indicate the sequence number of the frame. 119×Tc indicates that the service that is mapped to an OPU3 area in each row occupies 119×Tc bytes when Tp=32. The size of each container block is 10×Mts×3 bytes. When Tp=32, the size of each container block is 10×476×3 bytes. The rightmost figure indicates the nearly uniform interleaving of filled data and effective service data in a container block. As shown in FIG. 3, when Tc=3, Tp=32, and the service occupies the 1$^{st}$, 2$^{nd}$, and 3$^{rd}$ sub-timeslots in an OPUk area, the GMP in the OPUk area having the 1$^{st}$ frame indicates the service clock information and effective service data mapping information that is transmitted in a container block which includes the 1$^{st}$, 2$^{nd}$, and 3$^{rd}$ sub-timeslots in the OPUk area having the 1$^{st}$ to the 11$^{th}$ frames among next 32 multi-frames. The GMP in the OPU OH area having the 2$^{nd}$ frame indicates the service clock information and effective service data mapping information that is transmitted in a container block which includes the 1$^{st}$, 2$^{nd}$, and 3$^{rd}$ sub-timeslots in the OPUk area having the 12$^{th}$ to the 22$^{nd}$ frames among next 32 multi-frames. The GMP in the OPU OH area having the 3$^{rd}$ frame indicates the service clock information and effective service data mapping information that is transmitted in a container block which includes the 1$^{st}$, 2$^{nd}$, and 3$^{rd}$ sub-timeslots in the OPUk area having the 23$^{rd}$ to the 32$^{nd}$ frames among next 32 multi-frames.

Figure 4:
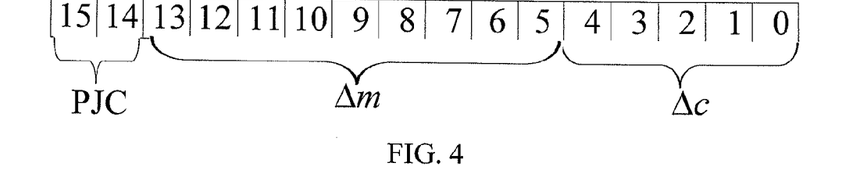
FIG. 4 shows a structure of a GMP.

In the concrete implementation, a GMP can be used for mapping and transmitting the service clock information. FIG. 4 shows the structure of a GMP. The GMP contains the service clock information value Cbyte. Cbyte indicates the service clock information that is sent in a container block, and is represented by $\Delta m$ and $\Delta c$. The Cbyte value in the GMP can be generated by using different methods. In the embodiment, the following implementation modes are described. Of course, Cbyte may also be generated by using other methods.

Method 1: Cbyte indicates the number of effective service bytes that are transmitted by each container block, that is, the service clock information. The receiving end can de-map and recover the service clock based on the Cbyte value. Cbyte is generated by discriminating the phrase of service clock and OTUk clock and then caching the generated Cbyte. Subsequently, $\Delta m$ and $\Delta c$ are acquired directly by converting the formula Cbyte=((n-1)*Mts+$\Delta m$)*Tc+$\Delta c$, that is, $\Delta m$ and $\Delta c$ are acquired on the basis of Cbyte, Mts, and Tc. In the embodiment, an example is taken to facilitate the understanding of the preceding formula. In other embodiments, the preceding formula may be converted to acquire $\Delta m$ and $\Delta c$. Where, n represents the number of frames contained in each container block, $\Delta m$ and $\Delta c$ represent two different areas in the GMP. $\Delta m$ ranges from 0 byte to (Mts-1) bytes, Tc ranges from 1 sub-timeslot to Tp sub-timeslots, and $\Delta c$ ranges from 0 byte to Tp-1 byte. Mts represents the number of bytes contained in each sub-timeslot, and Mts=3808×4/Tp. The service clock information is transmitted through the $\Delta m$ and $\Delta c$ areas of GMP, that is, $\Delta m$ and $\Delta c$ are filled into the GMP location area corresponding to the timeslot to transmit the clock information of service data.

Cbyte is generated by using the following method: calculating the maximum byte number of service data transmitted by each container block as the service clock information value Cbyte_max, and calculating the minimum byte number of service data transmitted by each container block as the service clock information value Cbyte_min on the basis of the service and container rate. The service clock information value that is transmitted by each container block must be in the range of [Cbyte_min, Cbyte_max]. Cbyte that indicates the size of container block as n×476×Tc bytes is calculated. Among which, n varies with the selected Tp and Tc, and n is equal to the size of container block with the payload quantity that is indicated by GMP.

Subsequently, the number of service data bytes that are received is accumulated. The service clock information values that are determined previously are accumulated. The total number of service data bytes is compared with the total service clock information value in an OTUk cycle of every n frames. The service clock information is generated on the basis of the comparison result. If the total service clock information value is greater than the total number of service data bytes, the current service clock information value is updated to a value that is acquired by subtracting 1 from the previously output service clock information value. The value must be in the range of [Cbyte_min, Cbyte_max] or selected as the Cbyte_min value. If the total service clock information value is smaller than the total number of service data bytes, the current service clock information value is updated to a value that is acquired by adding 1 to the previously output service clock information value. The value must be in the range of [Cbyte_min, Cbyte_max] or selected as the Cbyte_max value.

In this way, when performing de-mapping, the receiving end can acquire the number of effective service bytes (that is Cbyte) that are transmitted by each container block according to $\Delta m$ and $\Delta c$ in GMP. Cbyte is acquired by using the following formula: Cbyte=((n-1)*Mts+$\Delta m$)*Tc+$\Delta c$, that is, $\Delta m$ and $\Delta c$ are acquired on the basis of Cbyte, Mts, and Tc. In the embodiment, an example is taken to facilitate the understanding of the preceding formula. In other embodiments, the preceding formula may be converted to acquire $\Delta m$ and $\Delta c$. Where, n represents the number of frames contained in each container block, $\Delta m$ and $\Delta c$ represent two different areas in the GMP. $\Delta m$ ranges from 0 byte to (Mts-1) bytes, Tc ranges from 1 sub-timeslot to Tp sub-timeslots, and $\Delta c$ ranges from 0 byte to Tp-1 byte. Mts represents the number of bytes contained in each sub-timeslot, and Mts=3808×4/Tp.

For example, when Tc=2, Tp=32, and the service data occupies the OPUk sub-timeslots 1, 2, and 3, three sub-timeslots in the OPUk area having the 1$^{st}$ to the 11$^{th}$ frames are combined into the first container block. Cbyte corresponding to the container block indicates the GMP information of the 1$^{st}$ frame in the previous Tp multi-frame, that is Cbyte=(10*476+$\Delta m$)*Tc+$\Delta c$. Three sub-timeslots in the OPUk area having the 12$^{th}$ to the 22$^{nd}$ frames are combined into the second container block. Cbyte corresponding to the container block indicates the GMP information of the 2$^{nd}$ frame in the previous Tp multi-frame, that is Cbyte=(10*476+$\Delta m$)*Tc+$\Delta c$. Three sub-timeslots in the OPUk area having the 23$^{rd}$ to the 32$^{nd}$ frames are combined into the third container block. Cbyte corresponding to the container block indicates the GMP information of the 3$^{rd}$ frame in the previous Tp multi-frame, that is Cbyte=(9*476+$\Delta m$)*Tc+$\Delta c$.

Method 2: Cbyte indicates the number of effective service bytes that are transmitted by each container block (476×Tp bytes=15232 bytes), that is, the service clock information. The receiving end can de-map and recover the service clock based on the Cbyte value. Cbyte is generated by discriminating the phrase of service clock and OTUk clock and then caching the generated Cbyte. Subsequently, the number of bytes $C_{idle}$ to be filled is calculated according to Cbyte, that is, $C_{idle}$=Mts*Tp-Cbyte. $\Delta m$ and $\Delta c$ are acquired directly by converting the formula $C_{idle}$=Mts-($\Delta m$*Tc+$\Delta c$). Mts represents the number of bytes contained in each sub-timeslot, that is Mts=3808×4/Tp. Subsequently, the service clock information is transmitted through the Δm and Δc areas of GMP, that is, Δm and Δc are filled into the GMP location area corresponding to the timeslot to transmit the clock information of service data.

Cbyte is generated by using the following method: calculating the maximum number of service data bytes that are transmitted by each container block as the service clock information value Cbyte_max and, calculating the minimum number of service data bytes that are transmitted as the service clock information value Cbyte_min on the basis of the service and container rate. The service clock information value that is transmitted by each container block must be in the range of [Cbyte_min, Cbyte_max]. The size of the container block that is used for calculating Cbyte is fixed to Mts×Tp bytes. That is, the time interval for phrase discrimination is uniform.

Subsequently, the number of service data bytes is accumulated. The service clock information values that are determined previously are accumulated. The total number of service data bytes is compared with the total service clock information value in a container cycle of every Mts×Tp=15232 bytes. The service clock information is generated on the basis of the comparison result. If the total service clock information value is greater than the total number of service data bytes, the service clock information value is updated to a value that is acquired by subtracting 1 from the previously output service clock information value. The value must be in the range of [Cbyte_min, Cbyte_max] or selected as the Cbyte_min value. If the total service clock information value is smaller than the total number of service data bytes, the current service clock information value is updated to a value that is acquired by adding 1 to the previously output service clock information value. The value must be in the range of [Cbyte_min, Cbyte_max] or selected as the Cbyte_max value.

In this way, when performing de-mapping, the receiving end can acquire Cbyte according to Δm and Δc in GMP by using the formula Cbyte=((Tp−1)*Mts+Δm)*Tc+Δc.

In an embodiment of the present disclosure, the service data is mapped in the unit of Tc sub-timeslot, while phrase discrimination is performed for the service clock information in the unit of byte. FIG. 4 shows that the payload quantity justification byte (PJC) provided in an embodiment of the present invention is used for compensating the difference between the service data and the service clock information. PJC is generated by using the following method: The Δc values in the GMP byte are accumulated. If the accumulated value is greater than Tc, the accumulated value is eliminated to 0, and PJC is set to 1. Otherwise, the Δc values are accumulated continuously and PJC=0.

In the specific application, the information service data is filled into the OPUk OH area to transmit the related information of the service data in a container block. For example, the location information about the effective service data can be contained in a container block, so that the receiving end de-maps and recovers the service data. Those skilled in the art can transmit the location information about effective data in a container in various modes. For example, the location information about effective data in a container block can be transmitted by filling the service data information in the preceding GMP byte. In an embodiment of the present invention, for convenience, the method can be indicated by Δm and Δc of GMP and PJC. The detailed information is as follows.

The service payload quantity Cn can be acquired on the basis of PJC. Cn represents the number of effective service bytes that are transmitted actually by each container block, that is, the location information about effective service data in a container. The receiving end can de-map and recover service data based on the Cn value. Cn=((n−1)*Mts+Δm+PJC)*Tc where: Mts represents the number of bytes contained in each sub-timeslot, and Mts=3808×4/Tp; n represents the number of frames contained in each container block; Δm ranges from 0 byte to (Mts−1) bytes; Tc ranges from 1 sub-timeslot to 32 sub-timeslots; and PJC ranges from 0 to 1.

For example, when Tc=3, Tp=32, and services occupy the OPUk sub-timeslots 1, 2, and 3, the GMP in the OPUk OH area having the $1^{st}$ frame indicates the amount of effective service data transmitted in a container block, whose size is 11×476×3 bytes and which is composed of the sub-timeslots 1, 2, 3 in the OPUk area having the $1^{st}$ to the $11^{th}$ frames among next 32 multi-frames, by using the formula Cn=(10*476+Δm+PJC)*Tc. The service data and filled bytes are uniformly added to the sub-timeslots 1, 2, and 3 in the OPUk area having the $1^{st}$ to the $11^{th}$ frames by using the Sigma-Delta accumulator method.

The GMP in the OPUk OH area having the $2^{nd}$ frame indicates the amount of effective service data transmitted in a container block, whose size is 11×476×3 bytes and which is composed of the sub-timeslots 1, 2, 3 in the OPUk area having the $12^{th}$ to the $22^{nd}$ frames among next 32 multi-frames, by using the formula Cn=(10*476+Δm+PJC)*Tc. The service data and filled bytes are uniformly added to the sub-timeslots 1, 2, and 3 in the OPUk area having the $12^{th}$ to the $22^{nd}$ frames.

The GMP in the OPUk OH area having the $3^{rd}$ frame indicates the amount of effective service data transmitted in a container block, whose size is 10×476×3 bytes and which is composed of the sub-timeslots 1, 2, and 3 in the OPUk area having the $23^{rd}$ to the $32^{nd}$ frames among next 32 multi-frames, by using the formula Cn=(9*476+Δm+PJC)*Tc. The service data and filled bytes are uniformly added to the sub-timeslots 1, 2, and 3 in the OPUk area having the $23^{rd}$ to the $32^{nd}$ frames.

The preceding section describes the method for multiplexing and mapping services to an OTUk provided in an embodiment of the present disclosure. It is understandable that the preceding method is also applicable to other OTUs which are not OTUks. With the method, the service data is filled into a container block, and the service data information and service clock information are transmitted separately, so that services are mapped into an OTU. The specific mapping process is unrelated to the k value. Therefore, no detailed description is given.

The forgoing section describes a method for multiplexing and mapping services to an OTU in detail through embodiments. The following section describes a device for multiplexing and mapping services to an OTU correspondingly.

Figure 5:
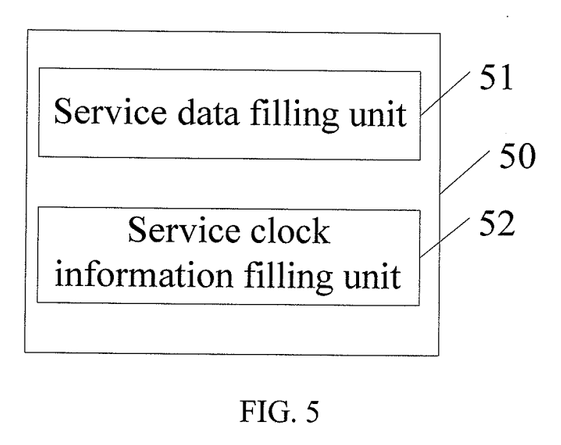
FIG. 5 shows a structure of device 1 for multiplexing and mapping services to an OTUk provided in an embodiment of the present disclosure.

FIG. 5 shows a structure of a device for multiplexing and mapping services to an OTU provided in an embodiment of the present disclosure. The device 50 includes:

a service data filling unit 51, configured to fill service data into a container block composed of an OPU area container having at least one frame, where the OPU area container is composed of at least one OPUk area sub-timeslot; and a service clock information filling unit 52, configured to: fill the service clock information into the OPU OH area to transmit the clock information of service data.

In the embodiment, the service data and service clock information are filled respectively. The service data is filled into a container block. The container block is composed of OPUk area containers having one or more frames. An OPUk area container is composed of one or more OPUk area sub-timeslots. Different sub-timeslots can meet the requirements of services of different types at different rates. In addition, the service clock information is filled into the OPU OH area. The service clock information is adjusted according to the byte-based step, and the service data is bundled according to the occupied timeslot for transmission and is adjusted uniformly to ensure the high-performance transparent transmission of clock information and effectively reduce the complexity of transmitting and processing service data. Furthermore, the high-performance transparent transmission of clock information helps a de-mapping receiving end effectively filter out a great deal of jitter produced in the process of OTN multiplexing, mapping, and demultiplexing and recover a high-performance clock.

Figure 6:
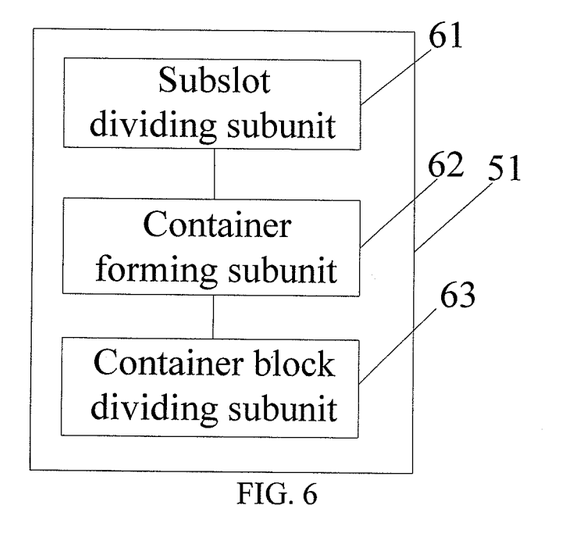
FIG. 6 shows a structure of a service data filling unit provided in an embodiment of the present disclosure.

FIG. 6 shows a structure of a service data filling unit provided in an embodiment of the present disclosure. The unit includes:

a sub-timeslot dividing subunit 61, configured to divide an OPU area into Tp sub-timeslots, where Tp≧1. Each sub-timeslot contains Mts bytes, where Mts=3808×4/Tp;

a container forming subunit 62, configured to form divided sub-timeslots into a container; and a container block dividing subunit 63, configured to classify every Tp frames into a container block according to the Tc value, so that the number of frames contained in each container is uniform, where Tc represents the number of timeslots for transmitting service data, and Tc=1 to Tp.

After an OPU area is divided into Tp sub-timeslots, an OTU can provide Tc (Tc=1 to Tp) sub-timeslots to transmit service data. Each sub-timeslot contains Mts bytes, where Mts=3808×4/Tp. Multiple sub-timeslots can be combined into a container for transmitting service data. The mapped traffic rate can be 0 to $$\frac{f_{opuk}}{Tp} * Tc \text{ Gbit/s.}$$

A container block is divided in uniform mode. Every Tp frames are divided into a container block according to the Tc value, so that the size of each container is as uniform as possible, that is, the number n of frames contained in each container is uniform. A container block is in a minimal unit of one sub-timeslot in an OPU area having one frame, that is, 3808×4/32=476 bytes.

Figure 7:
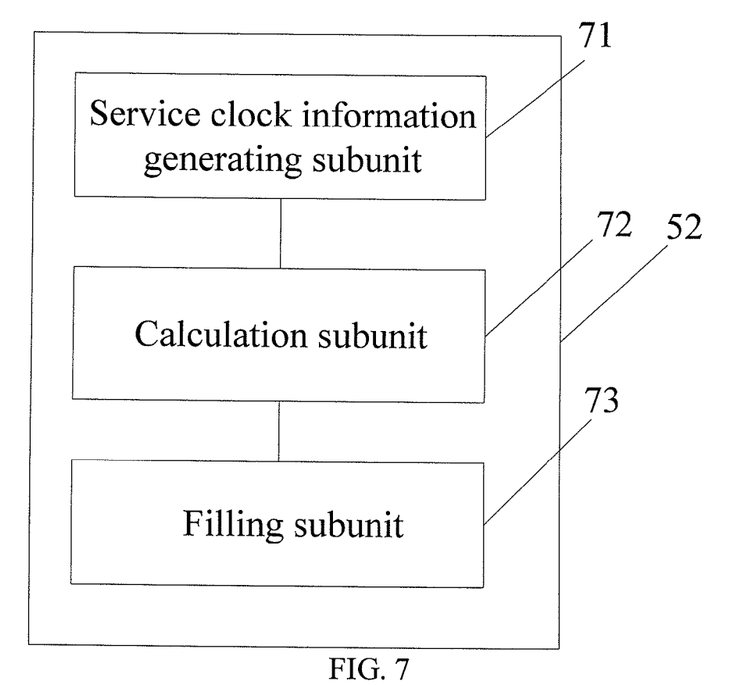
FIG. 7 shows a structure of a service clock information filling unit provided in an embodiment of the present disclosure.

The service clock information filling unit 52 is configured to transmit the clock information of service data through the $\Delta m$ and $\Delta c$ areas of GMP. As shown in FIG. 7, a service clock information filling unit provided in an embodiment includes:

a service clock information generating subunit 71, configured to: perform phase discrimination of service clock and OTU clock, and generate the Cbyte value;

a calculation subunit 72, configured to acquire the $\Delta m$ and $\Delta c$ of GMP according to the Cbyte value; and a filling subunit 73, configured to fill the service clock information into a GMP location area corresponding to timeslots according to $\Delta m$ and $\Delta c$.

Figure 8:
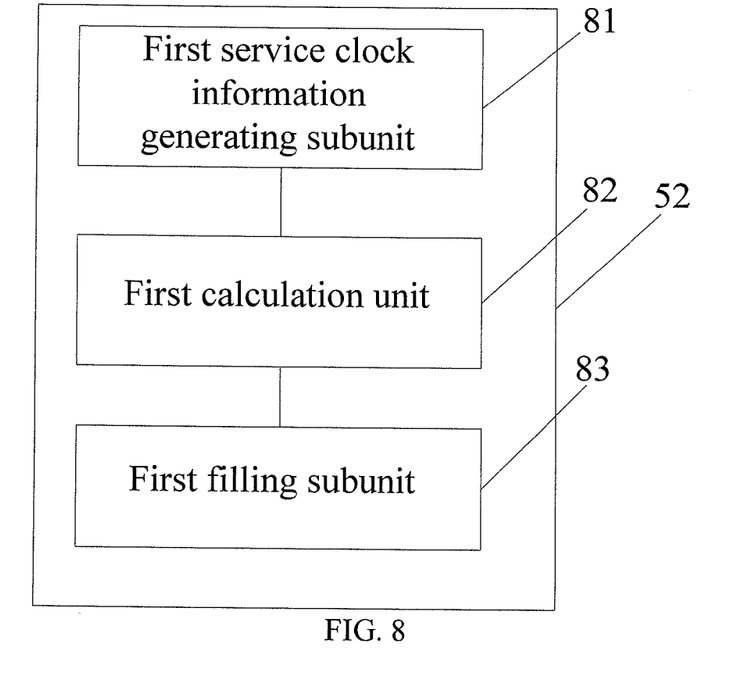
FIG. 8 shows a structure of service clock information filling unit 1 provided in an embodiment of the present disclosure.

The following embodiments describe how the service clock information filling unit 52 transmits the clock information of service data through the $\Delta m$ and $\Delta c$ areas of GMP:

FIG. 8 shows the structure of a service clock information filling unit provided in an embodiment of the present disclosure. The unit includes:

a first service clock information generating subunit 81, as the service clock information generating subunit 71 shown in FIG. 7, configured to generate the Cbyte value by performing phase discrimination of service clock and OTU clock and cache the value;

a first calculation subunit 82, as the calculation subunit 72 shown in FIG. 7, configured to acquire $\Delta m$ and $\Delta c$ according to the formula Cbyte=((n−1)*Mts+$\Delta m$)*Tc+$\Delta c$. In the embodiment, an example is taken to facilitate the understanding of the preceding formula. In other embodiments, the preceding formula may be converted to acquire $\Delta m$ and $\Delta c$. n represents the number of frames contained in each container block, $\Delta m$ and $\Delta c$ represent two different areas in the GMP. $\Delta m$ ranges from 0 byte to (Mts−1) bytes, Tc ranges from 1 sub-timeslot to Tp sub-timeslots, and $\Delta c$ ranges from 0 byte to Tp-1 byte; and a first filling subunit 83, as the filling subunit 73 shown in FIG. 7, configured to fill $\Delta m$ and $\Delta c$ calculated by the first calculation subunit 82 into the GMP location area corresponding to timeslots.

After receiving $\Delta m$ and $\Delta c$ in the GMP in the OPU OH area, the receiving device can acquire the Cbyte value according to the formula Cbyte=((n−1)*Mts+$\Delta m$)*Tc+$\Delta c$, and then recover a service clock.

Figure 9:
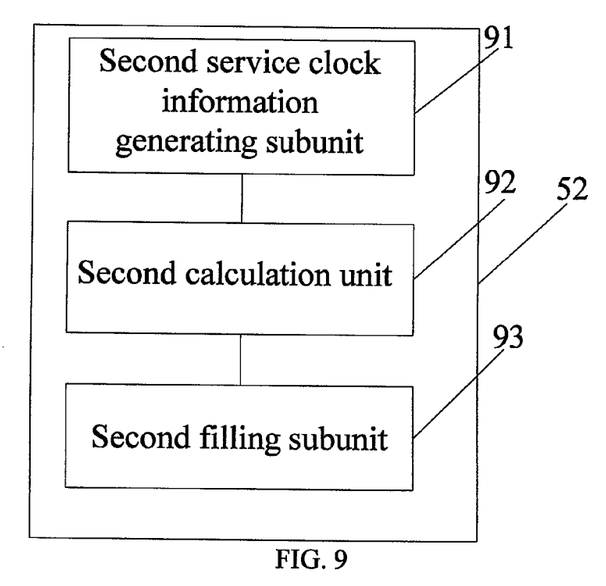
FIG. 9 shows a structure of service clock information filling unit 2 provided in an embodiment of the present disclosure.

FIG. 9 shows a structure of the service clock information filling unit 2 provided in an embodiment of the present disclosure. The unit includes:

a second service clock information generating subunit 91, as the service clock information generating subunit 71 shown in FIG. 7, configured to generate the Cbyte value by performing phase discrimination of service clock and OTU clock and cache the value;

a second calculation subunit 92, as the calculation subunit 72 shown in FIG. 7, configured to: calculate the number of bytes $C_{idle}$ to be filled according to the Cbyte value that is generated by the second service clock information generating subunit 91 and the formula $C_{idle}$=Mts*Tp−Cbyte, and acquire $\Delta m$ and $\Delta c$ according to the formula $C_{idle}$=476−($\Delta m$*Tc+$\Delta c$). In the embodiment, an example is taken to facilitate the understanding of the preceding formula. In other embodiments, the preceding formula may be converted to acquire $\Delta m$ and $\Delta c$. $\Delta m$ ranges from 0 byte to (Mts−1) bytes, where Tp represents the maximum value in the divided OPU area sub-timeslot, and $\Delta c$ ranges from 0 byte to Tp-1 bytes; and a second filling subunit 93, as the filling subunit 73 shown in FIG. 7, configured to fill $\Delta m$ and $\Delta c$ calculated by the second calculation subunit 92 into the GMP location area corresponding to timeslots.

After receiving $\Delta m$ and $\Delta c$ in the GMP in the OPU OH area, the receiving device can acquire $C_{idle}$ according to the formula $C_{idle}$=476−($\Delta m$*Tc+$\Delta c$), acquire the Cbyte value according to the formula $C_{idle}$=Mts*Tp−Cbyte, and then recover a service clock.

In an embodiment of the present disclosure, the service data is mapped in the unit of Tc sub-timeslot, while phrase discrimination is performed for the clock information in the unit of byte. To compensate the difference between the service data and the service clock information, set an adjusting unit in a service clock information filling unit.

Figure 10:
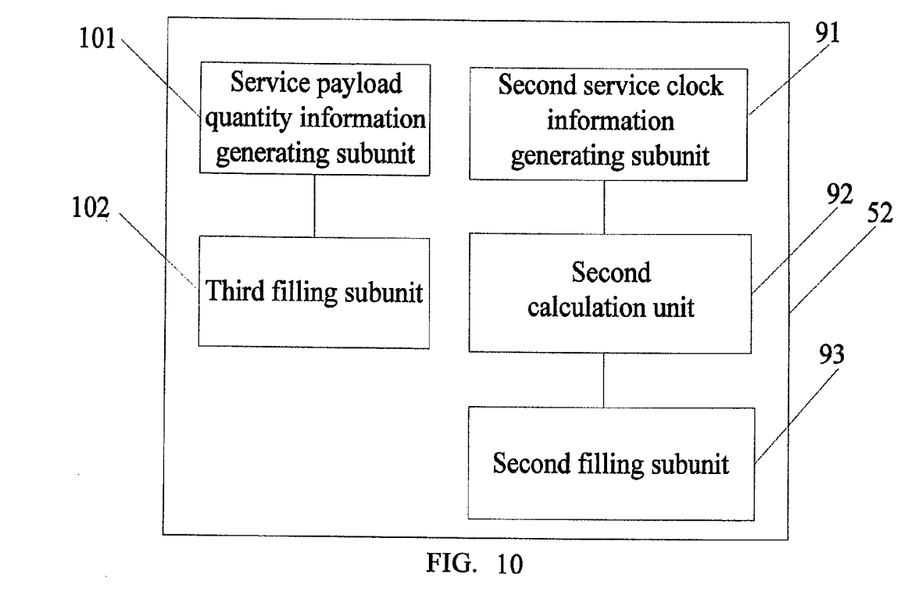
FIG. 10 shows a structure of service clock information filling unit 3 provided in an embodiment of the present disclosure.

FIG. 10 shows a structure of the service clock information filling unit 3 provided in an embodiment of the present disclosure. On the basis of the service clock information filling unit 2 shown in FIG. 9, the unit 3 is extended to include:

a service payload quantity information generating subunit 101, configured to accumulate the $\Delta c$ value in the GMP. When the accumulated value is greater than or equal to Tc, PJC is set to 1, when the accumulated value is smaller than Tc, PJC is set to 0; and a third filling subunit 102, configured to fill the service payload quantity information that is generated by the service payload quantity information generating subunit 101 into the corresponding GMP location area.

It is understandable that the service payload quantity information generating subunit 101 may also be used in the service clock information filling unit 1 shown in FIG. 8. No more details are given here.

Figure 11:
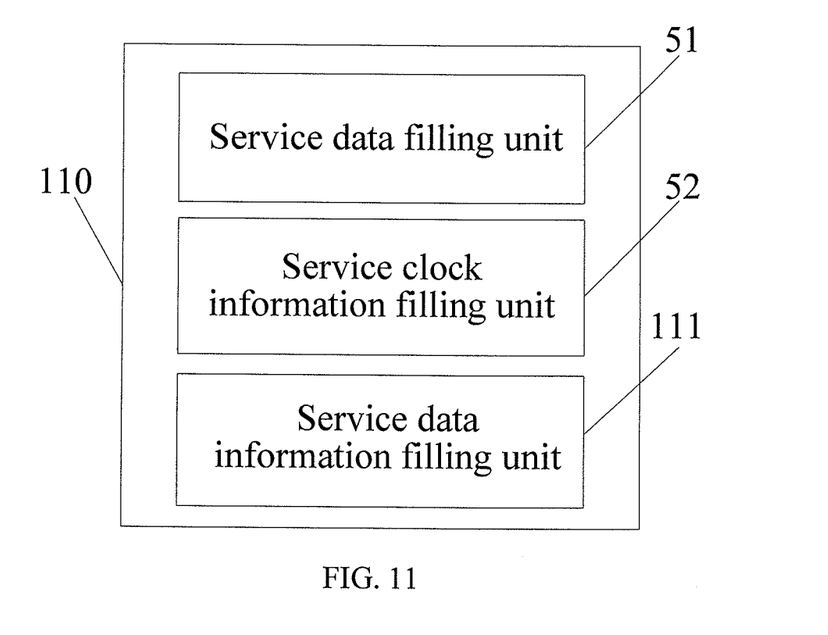
FIG. 11 shows a structure of device 2 for multiplexing and mapping services to an OTUk provided in an embodiment of the present disclosure.

The device 1 may also be extended. FIG. 11 shows structure of the device 2 which multiplexes and maps services to an OTU provided in an embodiment of the present disclosure. Different from the device 50, the device 110 also includes a service data information filling unit 111 that is configured to fill the service data information in the OPU OH area to transmit the location information of effective service data in the container block.

The device transmits the location information of effective service data in a container block through the service data information filling unit 111, so that the receiving device can perform de-mapping.

For convenience, the device 2 may generate the data required by a service data information filling unit based on the service clock information filling unit. For example, in the embodiment shown in FIG. 10, the data generated by a service clock information filling unit includes Δm, Δc, and PJC in the GMP and can serve as the data required by a service data information filling unit. In this case, when receiving the Δm, Δc, and PJC data, the receiving device can acquire the service payload quantity Cn information through the formula Cn=((n−1)*Mts+Δm+PJC)*Tc. Cn represents the number of effective service bytes actually transmitted in each container block, that is, the location information of effective service data in a container. Mts represents the number of bytes contained in each sub-timeslot, and Mts=3808×4/Tp. n represents the number of frames contained in a container block. Δm and PJC represent two different areas in the GMP. Δm ranges from 0 byte to (Mts−1) byte. Tc ranges from 1 sub-timeslot to 32 sub-timeslots. PJC ranges from 0 to 1.

It is understandable to those skilled in the art that all or part of the steps in the foregoing embodiments may be performed through hardware instructed by a program. The program may be stored in a computer-readable storage medium, which includes ROM, RAM, magnetic disk, and compact disk.

Detailed above are a method and a device for multiplexing and mapping service into an OTU provided in an embodiment of the present invention. Although the principle and implementation method in the invention are described through some exemplary embodiments, the disclosure is not limited to such embodiments. It is apparent that those skilled in the art can make various modifications and variations to the invention without departing from the spirit and scope of the disclosure. The invention is intended to cover the modifications and variations provided that they fall in the scope of protection defined by the following claims or their equivalents.

What is claimed is:

1. A method for multiplexing and mapping services to an Optical channel Transport Unit-k (OTUk), the method comprising:
   filling service data at different rate levels into a container block comprising at least one Optical channel Payload Unit-k (OPUk) area container having at least one frame, wherein the at least one OPUk area container is divided into a plurality of sub-timeslots, the plurality of sub-timeslots are combined to form the at least one OPUk area containers, each of the OPUk area container carries service data at a corresponding rate levels;
   filling service clock information into an OPUk overhead (OH) area to indicate a service clock; and
   filling compensating information into the OPUK overheard area to indicate difference between clocks of service data in the OPUK containers and the service clock, wherein the rate of the service data is between 0 and $$\frac{f_{opuk}}{Tp} * Tc \text{ Gbit/s,}$$

wherein Tp is total number of the sub-timeslots, and Tc is number of the sub-timeslots carrying the service data, and fopuk is transmitting frequency of service data in OPUk.

2. The method according to claim 1, wherein the method further comprises:
   filling related information of the service data into the OPUk OH area for transmitting the service data in the container block, the related information comprises location information about the effective service data in the container block.

3. A method for multiplexing and mapping services to an Optical channel Transport Unit-k (OTUk), the method comprising:
   filling service data at different rate levels into a container block comprising at least one Optical channel Payload Unit-k (OPUk) area container having at least one frame, wherein the at least one OPUk area container is divided into a plurality of sub-timeslots, the plurality of sub-timeslots are combined to form the at least one OPUk area containers, each of the OPUk area container carries service data at a corresponding rate levels;
   filling service clock information into an OPUk overhead (OH) area to indicate a service clock; and
   filling compensating information into the OPUK overheard area to indicate difference between clocks of service data in the OPUK containers and the service clock,
   wherein filling service clock information into an OPUk OH area to transmit the clock information of service data comprises:
   performing phrase discrimination for service clock and OTUk clock, and obtaining Cbyte value of service clock information, wherein the Cbyte value indicates number of effective service bytes that are transmitted by each container block; and
   obtaining Δm and Δc according to the Cbyte value, Mts, and Tc, wherein Mts is the byte number of each sub-timeslots, and Tc is the number of the sub-timeslots carrying the service data.

4. The method according to claim 3, wherein the compensating information comprises a payload quantity justification byte (PJC); and
   the step for generating the PJC comprises: accumulating the Δc in GMP bytes, and if the accumulated value is greater than or equal to Tc, setting the value of PJC to 1, and eliminating the accumulated value to 0; if the accumulated value is smaller than Tc, setting PJC to 0.

5. The method according to claim 3, wherein the step of obtaining Cbyte value of service clock information comprises:
   accumulating the byte number of the service data that are filled;
   accumulating the service clock information values; and
   comparing the total byte number of service data filled with the total service clock information value in an OTUk cycle of every n frames, and obtaining the Cbyte on the basis of the comparison result.

6. The method according to claim 5, wherein the step of obtaining Cbyte value of service clock information further comprises:

obtaining Cbyte_max, wherein the Cbyte_max is the maximum byte number of service data that are transmitted by each container block;

obtaining Cbyte_min, wherein the Cbyte_min is the minimum byte number of service data that are transmitted by each container block; and if the total service clock information value is greater than or equal to the total number of service data bytes, updating current Cbyte to a value that is acquired by subtracting 1 from previously output Cbyte, wherein minimum value of the current Cbyte is the Cbyte_min; if the total service clock information value is smaller than the total number of service data bytes, updating the current Cbyte by adding 1 to previously output Cbyte, wherein the maximum value of the current Cbyte is the Cbyte_max.

7. A device for multiplexing and mapping services to an Optical channel Transport Unit (OTU), wherein the device comprises:

a service data filling unit, configured to fill service data at different rate levels into a container block composed of at least one Optical channel Payload Unit (OPU) area container having at least one frame, wherein the at least one OPU area container is divided into a plurality of sub-timeslots, the plurality of sub-timeslots are combinated to form the at least one OPUk area containers, each of the OPUk area containers carries service data at a corresponding rate levels; and a service clock information filling unit, configured to fill service clock information into OPU area container to indicate a service clock, and fill compensating information into the OPUK overheard area to indicate difference between clocks of service data in the OPUK containers and the service clock, wherein the service clock information filling unit comprises:

a service clock information generating subunit, configured to perform phase discrimination of service clock and OTU clock, and obtaining Cbyte value;

a calculation subunit, configured to acquire $\Delta m$ and $\Delta c$ of General Map Pointer (GMP) according to the Cbyte value; and a filling subunit, configured to fill the $\Delta m$ and $\Delta c$ into a GMP location area.

8. The device according to claim 7, wherein the $\Delta m$ and $\Delta c$ is acquired according to the formula, $Cbyte=((n-1)\times Mts+\Delta m)\times Tc+\Delta c$, wherein the Mts is the byte number of each sub-timeslot, and Tc is number of the sub-timeslots carrying the service data.

9. The device according to claim 7, wherein the $\Delta m$ and $\Delta c$ is acquired through the step of:

obtaining Cidle according to a formula of $C_{idle}=Mts\times Tp-Cbyte$, wherein the Mts is the byte number of each sub-timeslots, and Tp is total number of the sub-timeslots; and obtaining $\Delta m$ and $\Delta c$ according to a formula of $C_{idle}=476-(\Delta m\times Tc+\Delta c)$, wherein the Tc is number of the sub-timeslots carrying the service data.

10. A device for multiplexing and mapping services to an Optical channel Transport Unit (OTU), wherein the device comprises:

a service data filling unit, configured to fill service data at different rate levels into a container block composed of at least one Optical channel Payload Unit (OPU) area container having at least one frame, wherein the at least one OPU area container is divided into a plurality of sub-timeslots, the plurality of sub-timeslots are combinated to form the at least one OPUk area containers, each of the OPUk area containers carries service data at a corresponding rate levels; and a service clock information filling unit, configured to fill service clock information into OPU area container to indicate a service clock, and fill compensating information into the OPUK overheard area to indicate difference between clocks of service data in the OPUK containers and the service clock, wherein the service data filling unit comprises:

a sub-timeslot dividing subunit, configured to divide an OPU area into Tp sub-timeslots, wherein the byte number of the sub-timeslots is 3808×4/Tp;

a container forming subunit, configured to form the sub-timeslots into the at least one OPU area container; and a container block dividing subunit, configured to convert some of the sub-timeslots for carrying service data.

11. The device according to claim 10, wherein the device further comprises a service data information filling unit, configured to fill related information of the service data into the OPUk OH area for transmitting the service data in the container block, wherein the related information comprises location information about the effective service data in the container block.

* * * * *